(12) United States Patent
Park

(10) Patent No.: US 10,893,408 B2
(45) Date of Patent: *Jan. 12, 2021

(54) METHOD AND APPARATUS FOR TRANSMITTING AND RECEIVING PROFILE IN COMMUNICATION SYSTEM

(71) Applicant: Samsung Electronics Co., Ltd., Suwon-si (KR)

(72) Inventor: Jong-Han Park, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/066,917

(22) PCT Filed: Dec. 26, 2016

(86) PCT No.: PCT/KR2016/015268
§ 371 (c)(1),
(2) Date: Jun. 28, 2018

(87) PCT Pub. No.: WO2017/116097
PCT Pub. Date: Jul. 6, 2017

(65) Prior Publication Data
US 2019/0020997 A1    Jan. 17, 2019

(30) Foreign Application Priority Data
Dec. 28, 2015    (KR) .......................... 10-2015-0187415

(51) Int. Cl.
*H04W 8/18* (2009.01)
*H04W 12/06* (2009.01)
(Continued)

(52) U.S. Cl.
CPC ............. *H04W 8/183* (2013.01); *H04W 8/20* (2013.01); *H04W 12/06* (2013.01); *H04W 12/08* (2013.01); *H04W 88/02* (2013.01)

(58) Field of Classification Search
CPC . H04L 67/306; H04L 67/30; H04L 29/06027; H04L 65/602; H04L 67/16;
(Continued)

(56) References Cited

U.S. PATENT DOCUMENTS

| 10,111,089 B2 * | 10/2018 | Park ....................... H04W 12/04 |
| 10,182,060 B2 * | 1/2019 | Lee ...................... H04L 63/0823 |

(Continued)

FOREIGN PATENT DOCUMENTS

| CN | 103747104 A | 4/2014 |
| CN | 103782568 A | 5/2014 |

(Continued)

OTHER PUBLICATIONS

Chinese Office Action dated Sep. 3, 2020, issued in Chinese International Application No. 201680076592.2.

*Primary Examiner* — Nimesh Patel
(74) *Attorney, Agent, or Firm* — Jefferson IP Law, LLP

(57) ABSTRACT

The present disclosure relates to a communication technique for converging a 5G communication system for supporting a higher data rate beyond a 4G system with an IoT technology, and a system therefor. The present disclosure can be applied to an intelligent service (e.g., smart home, smart building, smart city, smart car or connected car, health care, digital education, retail, security and safety related service, and the like) on the basis of a 5G communication technology and an IoT related technology. An embodiment of the present disclosure proposes a method for transmitting and receiving a profile by a terminal in a communication system, the method comprising the steps of: downloading the profile from a server that manages a profile for providing a communication service, and installing the same in an internal universal integrated circuit card (UICC); and deleting the (Continued)

profile from the UICC when a request event related to deletion of the profile is detected.

22 Claims, 12 Drawing Sheets

(51) Int. Cl.
  *H04W 12/08* (2009.01)
  *H04W 8/20* (2009.01)
  *H04W 88/02* (2009.01)
(58) Field of Classification Search
  CPC ... H04L 69/24; H04L 2209/80; H04L 63/107; H04L 9/30; H04L 9/3247; H04L 9/3297; H04L 41/5054; H04L 63/0853; H04L 67/125; H04L 63/0823; H04L 65/1073; H04L 67/303; H04L 9/0838; H04L 9/0863; H04L 9/0894; H04L 9/14; H04L 9/3263; H04L 9/3273; H04L 63/08; H04L 63/06; H04L 63/061; H04L 63/0838; H04L 63/205; H04L 67/025; H04L 9/08; H04L 63/062; H04L 63/10; H04L 12/1407; H04L 63/083; H04W 8/183; H04W 8/18; H04W 4/50; H04W 12/06; H04W 4/60; H04W 48/18; H04W 4/02; H04W 84/12; H04W 8/06; H04W 8/245; H04W 48/04; H04W 52/0212; H04W 12/04; H04W 8/205; H04W 12/08; H04W 8/20; H04W 76/10; H04W 12/00; H04M 15/88; H04M 2215/2026; H04M 15/8038; H04M 1/66; H04M 1/72577; H04M 2203/2005; H04M 15/7556; H04M 15/49; H04M 2203/655; H04M 2207/18; H04M 2215/46; H04M 15/745; H04M 2215/0108; H04M 1/274516; H04M 15/66; H04M 17/103
  See application file for complete search history.

(56) References Cited

U.S. PATENT DOCUMENTS

| | | | | |
|---|---|---|---|---|
| 2011/0306318 A1* | 12/2011 | Rodgers | ............... | H04W 8/183 455/410 |
| 2012/0260090 A1 | 10/2012 | Hauck et al. | | |
| 2013/0023235 A1* | 1/2013 | Fan | ....... | H04W 48/18 455/411 |
| 2013/0227646 A1* | 8/2013 | Haggerty | ........... | H04L 63/0853 726/3 |
| 2014/0045460 A1* | 2/2014 | Park | ....... | H04W 8/205 455/411 |
| 2014/0073292 A1* | 3/2014 | Kim | ....... | H04W 12/06 455/411 |
| 2014/0237101 A1* | 8/2014 | Park | ....... | H04L 67/303 709/223 |
| 2014/0357229 A1* | 12/2014 | Lee | ............. | H04W 12/0802 455/411 |
| 2015/0110035 A1 | 4/2015 | Lee et al. | | |
| 2016/0007190 A1* | 1/2016 | Wane | ............ | H04W 4/50 455/419 |
| 2016/0057624 A1* | 2/2016 | Yang | ............ | H04W 12/06 455/411 |
| 2016/0127132 A1 | 5/2016 | Lee et al. | | |
| 2017/0156051 A1* | 6/2017 | Park | ....... | H04L 67/22 |
| 2017/0215063 A1* | 7/2017 | Wozniac | ............... | H04W 8/183 |
| 2018/0295500 A1* | 10/2018 | Yang | ............ | H04W 8/183 |
| 2019/0053040 A1* | 2/2019 | Long | ............ | H04L 63/0876 |

FOREIGN PATENT DOCUMENTS

| | | |
|---|---|---|
| CN | 104883674 A | 9/2015 |
| KR | 10-2013-0114558 A | 10/2013 |
| KR | 10-2014-0024796 A | 3/2014 |
| KR | 10-2014-0086950 A | 7/2014 |
| KR | 10-2014-0140820 A | 12/2014 |
| WO | 2014/030893 A1 | 2/2014 |
| WO | 2015/018533 A1 | 2/2015 |

\* cited by examiner

METHOD AND APPARATUS FOR TRANSMITTING AND RECEIVING PROFILE IN COMMUNICATION SYSTEM

CROSS-REFERENCE TO RELATED APPLICATION(S)

This application is a U.S. National Stage application under 35 U.S.C. § 371 of an International application number PCT/KR2016/015268, filed on Dec. 26, 2016, which is based on and claimed priority of a Korean patent application number 10-2015-0187415, filed on Dec. 28, 2015, in the Korean Intellectual Property Office, the disclosure of which is incorporated by reference herein in its entirety.

BACKGROUND

The present disclosure relates to a method and apparatus for transmitting and receiving a profile for providing a communication service in a communication system.

To satisfy demands for wireless data traffic having increased since commercialization of 4th-Generation (4G) communication systems, efforts have been made to develop improved 5th-Generation (5G) communication systems or pre-5G communication systems. For this reason, the 5G communication system or the pre-5G communication system is also called a beyond-4G-network communication system or a post-long-term evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Internet, which is a human-oriented connectivity network where humans generate and consume information, is now evolving to the Internet of Things (IoT) where distributed entities, such as things, exchange and process information. The Internet of Everything (IoE) has also emerged, which is a combination of the IoT technology and the Big Data processing technology through connection with a cloud server.

As technology elements, such as sensing technology, wired/wireless communication and network infrastructure, service interface technology, and security technology, have been demanded for IoT implementation, a sensor network, a Machine to Machine (M2M), Machine Type Communication (MTC), and so forth have been recently researched for connection between things.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances, advanced medical services, and so forth through convergence and combination between existing IT and various industries.

Thus, various attempts have been made to apply 5G communication systems to IoT networks. For example, 5G communication technologies such as sensor networks, things communication, MTC, etc., have been implemented by schemes such as beamforming, MIMO, array antennas, and so forth. Application of the cloud RAN as the Big Data Processing technology may also be an example of convergence of the 5G technology and the IoT technology.

For a terminal's access to a wireless communication network, a mutual authentication process between the wireless communication network and the terminal is needed. Through the process, for example, a mobile network operator (MNO) may identify a terminal that subscribes to the MNO with fair compensation and may provide a service to the identified terminal. The terminal safely accesses the wireless communication network while maintaining security and performs data and voice communication. The mutual authentication process between the wireless communication network and the terminal is performed using a subscriber identity and an encryption key (for example, an encryption key K for authentication). In most terminals, the encryption key is stored in a separate universal integrated circuit card (UICC) that is physically removable from the terminal. The UICC is a smart card, which is mounted in the terminal and is available as a module for user authentication with the wireless communication network to which a user subscribes. That is, the UICC stores personal information of a wireless communication subscriber and performs subscriber authentication and traffic security key generation when accessing the wireless communication network, enabling safe use of wireless communication.

The UICC stores network information about a network operator or a common carrier to which the user subscribes (for example, an international mobile subscriber identity (IMSI), a home public land mobile network (home PLMN), or the like), user information (a short message service or the like), a phonebook, and so forth.

The UICC is also referred to as a subscriber identity module (SIM) card for the Global System for Mobile Communications (GSM) or a universal subscriber identification module (USIM) for Wideband Code Division Multiple Access (WCDMA) and the Long-Term Evolution (LTE).

The UICC is manufactured as a dedicated card for a corresponding operator at the request of a particular wireless network operator and is loaded therein in advance with authentication information for the operator's access to the network, for example, a USIM application, an IMSI, a K value, and so forth, before being released. Thus, the manufactured UICC card is delivered to a corresponding wireless network operator who then provides the UICC card to the subscriber and performs management such as installation, modification, deletion, or the like of an application in the UICC by using a technology such as the Over the Air (OTA) if needed. A subscriber inserts the UICC card into his/her own wireless communication terminal to use a network and an application service of the wireless network operator, and when changing the terminal with a new terminal, the subscriber may use the authentication information, phone numbers, a personal phonebook, and so forth stored in the UICC card in the new terminal, by inserting the UICC card into the new terminal.

During mutual authentication between the wireless communication network and the terminal, the terminal delivers an authentication message in the middle if performing UICC authentication with an authentication server of the wireless communication network. The UICC may not only identify the subscriber but also include related common carrier information when being manufactured. If the user who has used a wireless communication network subscribes to a wireless communication network of another network operator with the same terminal, the user has to use a UICC that is compatible with the wireless communication network of the other network operator. That is, if the old and new network operators are different, the user may use only a UICC that is compatible with the new network operator, though the user uses the same terminal.

Thus, the user should annoyingly exchange the existing UICC, which is removable from the terminal, with a new UICC to change the network operator. The UICC has decreased in size from the most widely used mini SIM and a micro SIM, recently, to a nano SIM, in terms of a form factor that defines a physical phenomenon. This tendency largely contributes to miniaturization of the wireless communication terminal, but a UICC card that is smaller than the recently established nano SIM is expected to be hard to standardize due to the risk of being lost by the user, and by nature of a removable UICC card, a space for mounting a removable slot on the terminal is needed, making further miniaturization difficult. To solve such problems, research has been carried out on a so-called embedded UICC (eUICC) which allows a profile for providing a communication service to be installed remotely through a network without a need to change an existing UICC even if a network operator is changed. The eUICC provides a network access authentication function in the same manner as the existing removable UICC but has many issues such as eUICC activation/distribution/subscriber information security, and so forth, such that measures against such issues need to be arranged. To this end, international standardization organizations, such as the European Telecommunications Standards Institute (ETSI), have standardized the eUICC with related companies like network operators, terminal manufacturers, SIM vendors, and so forth. In the ETSI, a working group (WG) for establishing the eUICC standards has worked and has defined the profile as a module to post-personalize an application for the network access authentication function of a network operator in the eUICC and has established requirements for remotely installing and managing the profile. Management policy and application schemes for the profile are under discussion, but detailed schemes have not yet been defined. Since details associated with eUICC profile management have not been defined, an eUICC card manufacturer, a terminal manufacturer, and an eco-system operator have many difficulties in developing and commercializing the eUICC.

The eUICC may be manufactured as a UICC that is fixed, for example, in the form of a chip and is loaded in advance in a terminal during a manufacturing process of the terminal. Thus, the eUICC is available in various terminals that may have structures in which the UICC is not easy to physically remove, such as an M2M or D2D terminal as well as a general wireless terminal such as a cellular phone.

By using the eUICC, the terminal may download the profile including a subscriber identity and an encryption key K for each network operator from a remote server and install the profile in the eUICC. Thus, the user may be provided with a wireless communication service through a changed MNO without a need to mount a new UICC on the terminal, even if the network operator is changed. The profile includes the subscriber identity and the encryption key K and may also include various information for a communication service provided by a network operator. That is, once the profile is remotely downloaded and installed in the eUICC from a network of the network operator, the subscriber identity and the encryption key K are also stored in the eUICC.

Meanwhile, after the profile is remotely downloaded and installed in the eUICC, a number resource of an eSIM card (that is, an IMSI value and an ICCID value) are not reusable. However, as communication systems are continuously developed and used, a number resource of an SIM card may become insufficient and thus the eUICC may not be used. For this end, a need exists for a scheme for efficiently reusing a number resource of an SIM card allocated to an eUICC in a communication system.

SUMMARY

An embodiment of the present disclosure provides a method and apparatus for transmitting and receiving a profile to provide a communication service in a communication system.

In addition, an embodiment of the present disclosure provides a method and apparatus for transmitting and receiving a profile, making it possible to increase the efficiency of use of a profile in a communication system.

A method for transmitting and receiving a profile by a terminal in a communication system according to an embodiment of the present disclosure includes downloading, from a server that manages a profile for providing a communication service, the profile and installing the profile in an internal universal integrated circuit card (UICC) and upon detecting a request event associated with deletion of the profile, deleting the profile from the UICC.

A method for transmitting and receiving a profile by a server in a communication system according to an embodiment of the present disclosure includes allocating a profile for providing a communication service to a terminal using a UICC, receiving a request message associated with deletion of the profile from the terminal, and adding an identifier associated with the profile to a profile list based on the request message.

An apparatus for transmitting and receiving a profile in a communication system according to an embodiment of the present disclosure includes a transceiver configured to transmit and receive data and a controller configured to download, from a server that manages a profile for providing a communication service, the profile, install the profile in an internal UICC, and upon detecting a request event associated with deletion of the profile, delete the profile from the UICC.

An apparatus for transmitting and receiving a profile in a communication system according to an embodiment of the present disclosure includes a transceiver configured to transmit and receive data and a controller configured to receive a request message associated with deletion of a profile from for providing a communication service from a terminal, allocate the profile to the terminal using a UICC, and add an identifier associated with the profile to a profile list based on the request message.

Other aspects, advantages, and key features of the present disclosure will be processed together with the attached drawings and will be apparent to those of ordinary skill in the art from the following detailed description disclosing various embodiments of the present disclosure.

Before undertaking the DETAILED DESCRIPTION OF THE INVENTION below, it may be advantageous to set forth definitions of certain words and phrases used throughout this patent document: The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation, and such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Throughout the drawings, similar reference numerals will be understood to refer to identical or similar elements, features, and structures.

DETAILED DESCRIPTION OF THE DISCLOSURE

Figure 1:
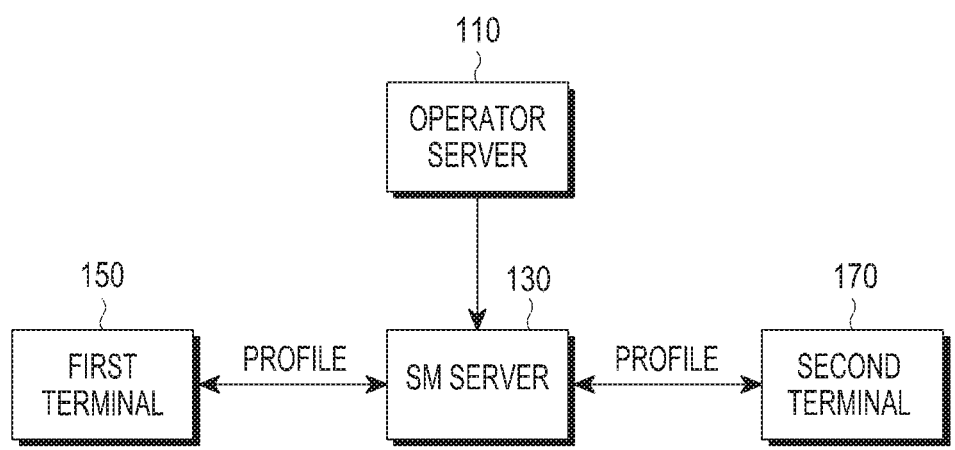
FIG. 1 is a diagram of a communication system to which an embodiment of the present disclosure is applied.

The following detailed description made referring to the accompanying drawings may help the comprehensive understanding of various embodiments of the present disclosure defined by claims and equivalents thereof. The following detailed description includes various specific details for understanding thereof, but these details will be regarded simply as examples. Therefore, those of ordinary skill in the art may recognize that various changes and modifications of various embodiments described herein may be made without departing from the scope and spirit of the present disclosure. In addition, a description of well-known functions and structures may be omitted for clarity and brevity.

Terms and words used in the following detailed description and claims are not limited to bibliographic meaning, but merely used by the inventor to enable a clear and consistent understanding of the present disclosure. Thus, it should be apparent to those of ordinary skill in the art that the following description of various embodiments of the present disclosure is provided merely for illustrative purposes, and not for purposes of limiting the present disclosure defined by the claims and their equivalents.

It is to be understood that the singular forms "a," "an," and "the" include plural referents unless the context clearly dictates otherwise. Thus, for example, a component surface includes one or more component surfaces.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having meanings that are the same as or similar with the contextual meanings of the relevant technology.

First, terms used herein will be defined in brief.

Herein, a universal integrated circuit card (UICC), which is a smart card inserted into a mobile communication terminal for use, means a chip in which personal information such as network access authentication information, a phonebook, and a short messaging service (SMS) of a mobile network operator is stored so as to allow safe use of mobile communication through subscriber authentication and traffic security key generation when a mobile communication network such as the Global System for Mobile Communications (GSM), the Wideband Code Division Multiple Access (WCDMA), the Long-Term Evolution (LTE), or the like is accessed. In the UICC, a communication application such as a subscriber identity module (SIM), a universal subscriber identification module (USIM), an Internet protocol (IP) multimedia services identity module (ISIM), or the like is mounted depending on a type of a mobile communication network to which a subscriber accesses, and a higher-level security function for installing various applications such as an electronic wallet, ticketing, an electronic passport, and the like may be provided.

Herein, the eUICC is a security module that is not of a removable type that may be inserted into and removed from the terminal but is in the form of a chip embedded in the terminal. However, an embodiment of the present disclosure is also applicable to the UICC. The eUICC may download and install a profile by using the Over the Air (OTA).

Herein, the term UICC may be interchangeably used with the SIM, and the term eUICC may be interchangeably used with the eSIM.

In the present disclosure, a profile may mean that an application, a file system, an authentication key, and so forth stored in the UICC are packaged in the form of software.

In the present disclosure, a USIM profile may have the same meaning as the profile or may mean that information included in an USIM application in the profile is packaged in the form of software.

In the present disclosure, an operational profile may mean that subscription information of a mobile network operator to which a user of the terminal subscribes is packaged in the form of software.

Herein, a provisioning profile may mean a profile needed for the terminal to access an arbitrary mobile communication network of an arbitrary country before the user of the terminal subscribes to a particular mobile network operator and may mean a profile mounted in the eUICC in advance.

In the present disclosure, a profile providing server may be expressed as subscription manager data preparation (SM-DP), SM-DP Plus (SM-DP+), an off-card entity of a profile domain, a profile encryption server, a profile generation server, a profile provisioner or a profile provider, or the like.

The term terminal used herein may be referred to as a mobile station (MS), a user equipment (UE), a user terminal (UT), a wireless terminal, an access terminal (AT), a terminal, a subscriber unit (SU), a subscriber station (SS), a wireless device, a wireless communication device, a wireless transmission and reception unit (WTRU), a mobile node, a mobile, or other terms. Various embodiments of the terminal may include a cellular phone, a smart phone having a wireless communication function, a personal digital assistant (PDA) having a wireless communication function, a wireless modem, a portable computer having a wireless communication function, a photographing device having a wireless communication function, such as a digital camera, a gaming device having a wireless communication function, a music storage and play home appliance having a wireless communication function and an Internet home appliance capable of wireless Internet connection and browsing, and portable units or terminals having integrated therein combinations of such functions.

In addition, herein, the terminal may include, but not limited to, a Machine to Machine (M2M) terminal and Machine Type Communication (MTC) terminal/device.

In the present disclosure, a profile identifier may be referred to as a factor matching, for example, a profile ID, an ICCID, and an ICCID and an issuer security domain-profile (ISD-P). The profile ID may indicate a unique identifier of each profile. In the present disclosure, the eUICC ID may be a unique identifier of the eUICC embedded in the terminal and may be referred to as an eUICC ID (EID). The eUICC ID may be a profile ID of a provisioning profile if the provisioning profile is mounted in advance in the eUICC. As in the embodiment of the present disclosure, when the terminal and the eUICC (or eSIM) chip are not separated from each other, the eUICC ID may be a terminal ID. The eUICC ID may refer to a particular secure domain of the eSIM chip.

FIG. 1 illustrates a configuration example of a communication system to which an embodiment of the present disclosure is applied.

Referring to FIG. 1, the communication system to which an embodiment of the present disclosure is applied may include an operator server 110, an SM server 130, and a plurality of terminals (for example, a first terminal 150 and a second terminal 170).

The operator server 110 provides a communication service to a subscriber.

The SM server 130 generates a profile for providing a communication service to each of the first terminal 150 and the second terminal 170 at the request of the operator server 110 of a mobile network operator (MNO) and supports remote installation of the generated profile. The SM server 130 may include an SM-DP server (not shown) and a subscription manager secure routing (SM-SR) server (not shown). If a start request for the terminal 150 is transmitted to the SM server 130 through the operator server 110, the SM-DP server included in the SM server 130 generates a profile suitable for a corresponding network operator and delivers the profile to the SM-SR server or terminal. The SM-DP server may be referred to as a profile providing server that generates the profile. The SM-DP server encrypts the generated profile and delivers the encrypted profile to the SM-SR server or terminal. The SM-SR server or the SM-DP transmits the profile to the eUICC by using the OTA.

While a description has been made of operations separately for the operator server 110 and the SM server 130 in a communication system according to an embodiment of the present disclosure, the operator server 110 and the SM server 130 may be considered as one server that manages the profile in terms of the terminal.

In FIG. 1, each of the first terminal 150 and the second terminal 170 receives a message for downloading the profile from the SM server 130, downloads the profile from the SM server 130 by using the received message, and installs the downloaded profile in an internal eUICC. The profile may include a number resource (that is, an IMSI value and an ICCID value) of the eSIM card and an encryption key K for authentication and may include various information for a communication service provided by a network operator.

In particular, each of the first terminal 150 and the second terminal 170 according to an embodiment of the present disclosure, upon receiving a profile deletion request event for requesting deletion of a profile through a user interface (UI) of an application (for example, a local profile assistant (LPA)), deletes the profile and transmits a message indicating that the profile is deleted to the SM server 130. In this way, the SM server 130 manages a profile, which is previously generated to provide a communication server in the first terminal 150, to be reused or enabled in the second terminal 170. Such a method for downloading a profile between the SM server 130 and one terminal and deleting the downloaded profile in the communication system will be described in detail with reference to FIGS. 2 and 3, and a method for reusing the deleted profile will be described in detail with reference to FIGS. 4 through 6.

Figure 2:
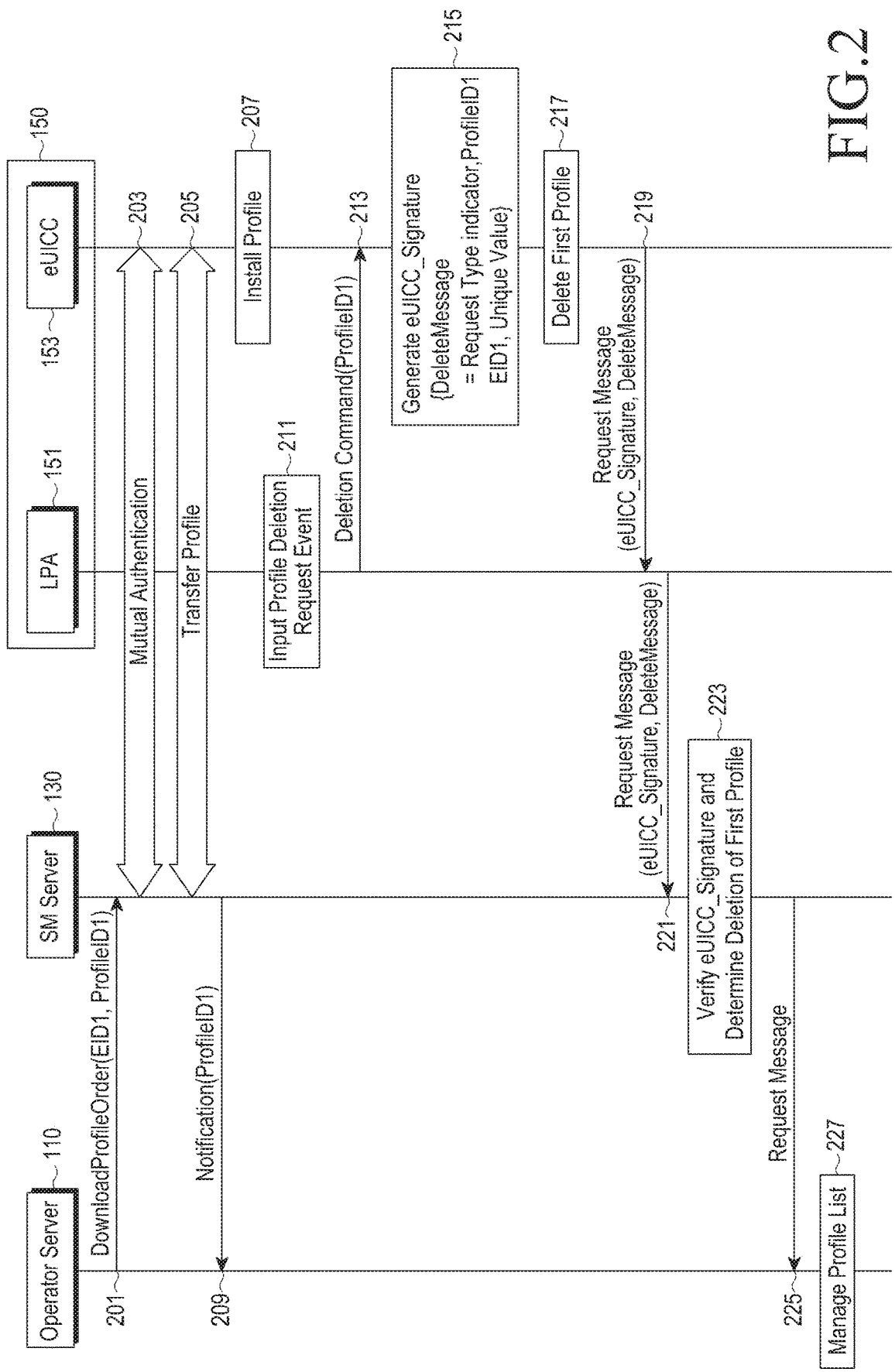
FIG. 2 is a diagram illustrating an example of a method for transmitting and receiving a profile, making it possible to increase the efficiency of use of a profile in a communication system according to an embodiment of the present disclosure.

FIG. 2 illustrates an example of a method for transmitting and receiving a profile that increases efficiency of use of a profile in a communication system according to an embodiment of the present disclosure. That is, the example illustrated in FIG. 2 pertains to a method for installing a first profile in an eUICC mounted inside the first terminal 150 and then deleting the installed first profile according to an input request event in the communication system.

Referring to FIG. 2, the SM server 130 receives a download profile order (DownloadProfileOrder) ordering generation of a profile from the operator server 110 in operation 201. The DownloadProfileOrder includes the EID for which the profile is to be installed and a Profile ID to be allocated to the EID. For example, in FIG. 2, it is assumed that the DownloadProfileOrder includes EID1 and Profile ID1 as information indicating generation of a first profile having Profile ID1 to the first terminal 150.

The SM server 130 performs mutual authentication with an eUICC 153 included in the first terminal 150 by using the subscriber identifier and the encryption key K for mutual authentication in operation 203. After completion of mutual authentication, the first terminal 150 receives a message for downloading the first profile having ProfileID1 from the SM server 130 and downloads the first profile having ProfileID1 from the SM server 130 by using the received message in operation 205 and installs the downloaded first profile in the internal eUICC 153 in operation 207. The first profile may include the number resource (that is, an IMSI value and an ICCID value) of the eSIM card and the encryption key K for authentication and may include various information for a communication service provided by a network operator. Mutual authentication and installation of the first profile, performed between the SM server 130 and the first terminal 150 in operations 203 through 207, may be performed in the same manner as or a similar manner to mutual authentication and profile installation used in the same technical field as the background technical field of the present disclosure. Thus, a detailed description of mutual authentication and installation of the first profile performed between the SM server 130 and the first terminal 150 in operations 203 through 207 of FIG. 2 will not be provided herein.

In operations 205 and 207, the eUICC 150 obtains a unique value for the first profile, which is used during installation of the first profile. The unique value may be exchanged or transmitted in a process 205 of transmitting and receiving a message for downloading the first profile between the SM server 130 and the eUICC 150. The unique value may be, for example, one of a matching identifier (MatchingID), an event identifier (EventID), a transaction identifier (TransactionID), a challenge value generated in the SM server 130, and a challenge value generated in the eUICC 150. The unique value may be a value corresponding to combinations of a plurality from among the MatchingID, the EventID, the TransactionID, and the challenge value generated by the SM server 130, and the challenge value generated by the eUICC 150 or a value derived from the combinations.

Referring back to FIG. 2, if downloading or installation of the first profile is completed in the first terminal 150, the SM server 130 transmits a notification message indicating that the first profile is allocated to the first terminal 150 to the operator server 110 in operation 209. The notification message may include the ProfileID1 for notifying that the first profile is allocated.

After the first profile is installed in the eUICC 153 mounted in the first terminal 150, the first terminal 150, the first terminal 150 receives a profile deletion request event for requesting deletion of the first profile through a UI in operation 211, and LPA 151, delivers a deletion command to the eUICC 153 in operation 213. The deletion command may include a ProfileID to be deleted according to the profile deletion request event, and may include, for example, the ProfileID1. The deletion command may be indicated by an ES10_Local Profile Delete or DELETE command.

The eUICC 153, upon receiving a deletion command including the ProfileID1, generates a signature value (eUICC_Signature) for indicating that the eUICC 153 having completed authentication with the previous SM server 130 requests deletion of the first profile having the ProfileID1 in operation 215. The eUICC_Signature value is about at least one of a request type indicator indicating profile deletion, a ProfileID, an EID, and the unique value. The eUICC_Signature may be used as a private key of the eUICC 153. The private key may be SK.eUICC.ECDSA or SK.ECASD.ECDSA.

The eUICC 153 deletes the first profile having the ProfileID1 in operation 217. Depending on implementation of the first terminal 130, the deletion of the first profile performed in operation 217 may be performed prior to the eUICC_Signature generation process performed in operation 215.

The eUICC 153 delivers a request message including the eUICC_Signature and data used in generation of the eUICC_ Signature (for example, data including at least one of the type indicator indicating deletion of the first profile, the ProfileID, the EID, and the unique value) to the LPA 151 in operation 219. The request message may further include at least one of a certificate of the eUICC 153, a certificate of a manufacturer of the eUICC 153, and information of the SM server 130 that is to transmit the information (for example, an SM-DP server address and an SM-SR server address). Meanwhile, the eUICC 150 may transmit a response message including information indicating that the first profile has been deleted, without transmitting the request message to the LPA 151.

The LPA 151, upon receiving the request message from the eUICC 153, updates a profile list stored in the eUICC 153 stored in an internal storage, based on the eUICC_Signature and the data used in generation of the eUICC_Signature, which are included in the request message. For example, the LPA 151 may delete the first profile corresponding to the received eUICC_Signature and output the profile list from which the first profile is deleted to an output unit (not shown) of the first terminal 153.

The LPA 151 transmits the request message received from the eUICC 153 to the SM server 130 in operation 221. The SM server 130, upon receiving the request message from the LPA 151, verifies based on the eUICC_Signature included in the request message whether the request message has been transmitted from the previously authenticated eUICC 153.

For example, if the eUICC_Signature for the eUICC 150 stored inside the SM server 130 and the eUICC_Signature included in the request message have the same value, the SM server 130 may verify that the request message has been transmitted from the previously authenticated eUICC 153.

If the verification is successful, the SM server 130 determines based on data associated with the eUICC_Signature included in the request message that the first profile has been deleted from the first terminal 150 in operation 223.

The SM server 130 transmits the request message to the operator server 110 to notify that the first profile has been deleted from the first terminal 150, in operation 225. The operator server 110 determines based on the data associated with the eUICC_Signature included in the request message that the first profile has been deleted from the first terminal 150 in the same manner as or a similar manner to the SM server 130 and adds the first profile to the profile list in operation 227.

The above description has been made of the method for installing a profile and deleting the installed profile between the SM server 130 and the first terminal 150 in the communication system, and hereinafter, an example of deleting the profile from the first terminal 150 through the UI will be described with reference to FIG. 3.

Figure 3:
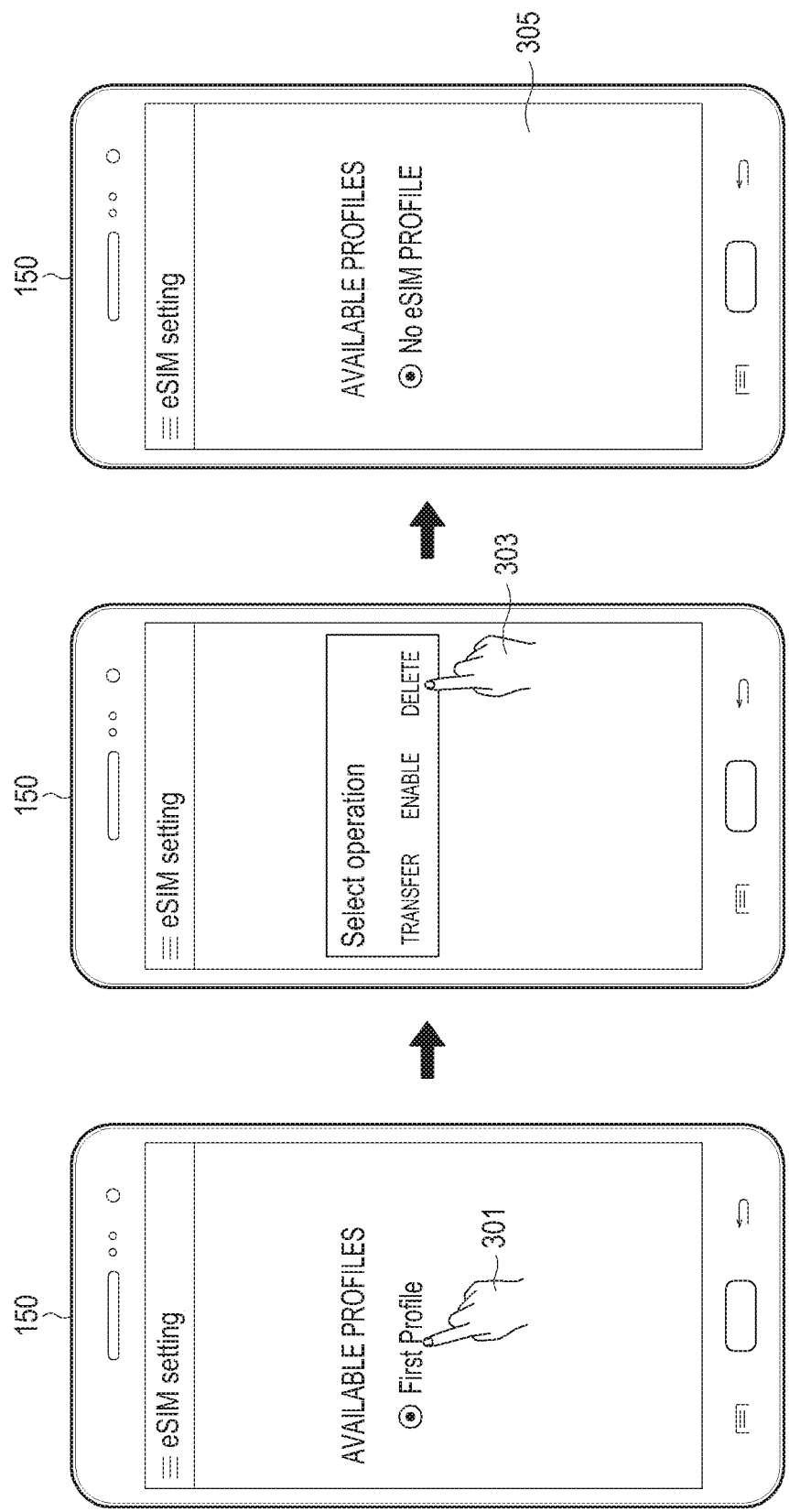
FIG. 3 illustrates an example in which a profile is deleted from a terminal through a user interface (UI) in a communication system according to an embodiment of the present disclosure.

FIG. 3 illustrates an example in which a profile is deleted from a terminal through a UI in a communication system according to an embodiment of the present disclosure.

Referring to FIG. 3, if available profiles are output on a UI of an application (for example, an LPA) for eSIM setting of the first terminal 150, the first terminal 150 receives a select event to select the first profile for deletion of the first profile among the available profiles as indicated by 301. Then, once a select operator for select operations including transfer, enable, and delete is output on the UI of the first terminal 150, the first terminal 150 receives a profile deletion request event for requesting deletion of the selected profile through the output select operator as indicated by 303. As deletion of the first profile installed in the eUICC of the first terminal 150 is performed, absence of available profiles may be indicated on the UI as indicated by 305.

Meanwhile, the first terminal 150 may determine whether to perform the next procedure through an additional input of the user, after receiving the deletion request event through the UI. For example, after operation 301 and/or operation 303, the first terminal 150 may display a confirmation request unit for requesting confirmation in the form of a pop-up on the UI. The confirmation request unit may include a button such as 'confirm' or 'cancel', such that a subsequent process (that is, operation 303 and/or operation 305) is performed only after an event for a 'confirm' input is input from the user, and if an event for a 'cancel' input is input from the user, a subsequent process (that is, operation 303 and/or operation 305) may not be performed. In another example, after operation 301 and/or operation 303, the first terminal 150 may display a password input unit for inputting a predetermined password in the form of a pop-up through the UI. In this case, the terminal 150 may perform a subsequent process (that is, operation 303 and/or operation 305) only after a valid password is input through the UI.

With reference to FIGS. 2 and 3, a description has been made of the method for installing a profile and deleting the installed profile between the SM server 130 and the first terminal 150 according to an embodiment of the present disclosure. Next, a description will be made of an example of a method for deleting a profile installed in an internal eUICC of the first terminal 150 and reusing the profile deleted from the first terminal 150 by another terminal (for example, the second terminal 170) with reference to FIGS. 4 and 5. The example of the method for reusing the profile deleted from the first terminal 150 by another terminal is applicable to a case if the first terminal 150 used by the user is swapped with the second terminal 170.

Figure 4:
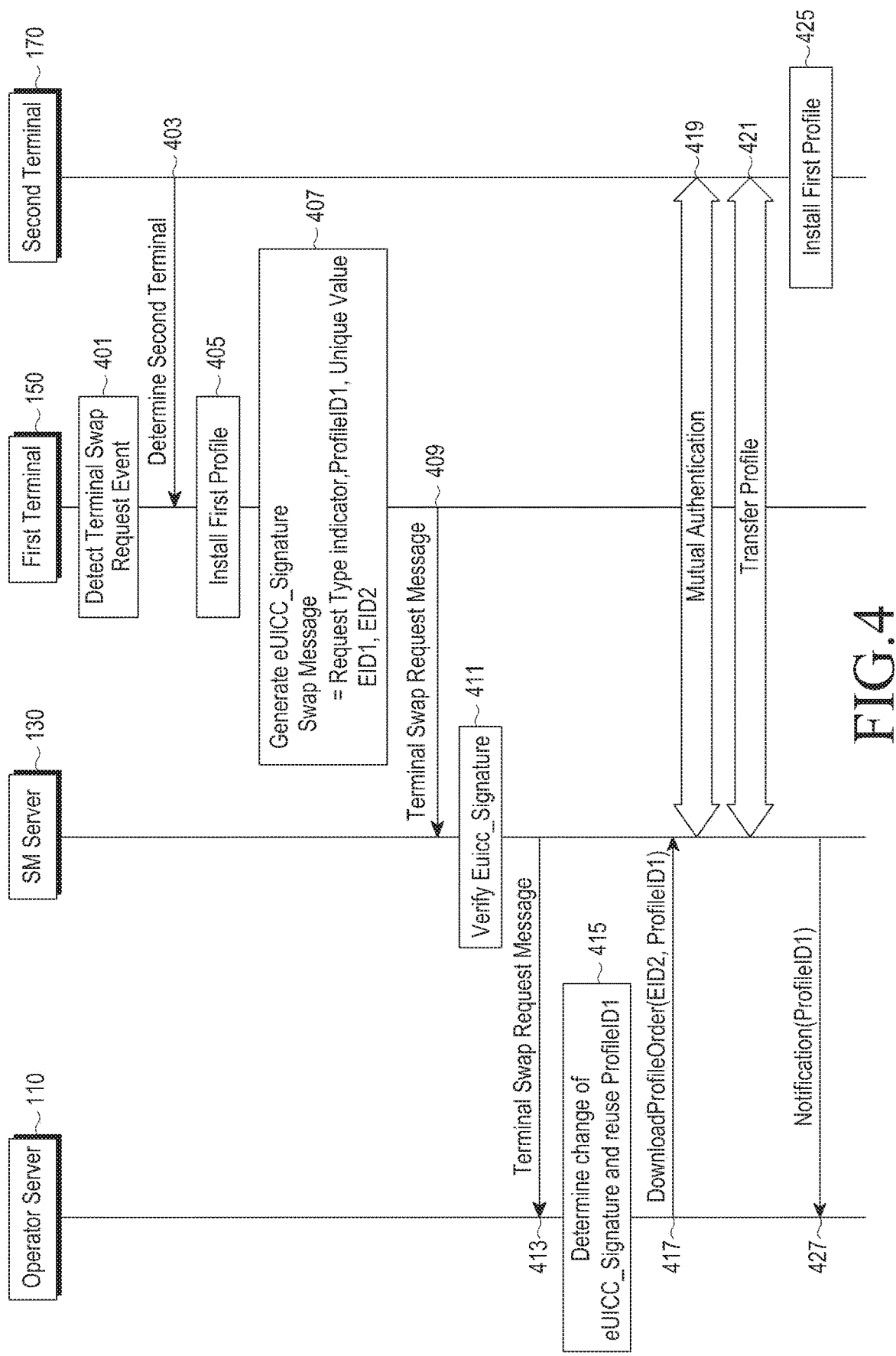
FIG. 4 is a diagram illustrating another example of a method for transmitting and receiving a profile, making it possible to increase the efficiency of use of a profile in a communication system according to an embodiment of the present disclosure.

FIG. 4 illustrates another example of a method of transmitting and receiving a profile that increases the profile utilization efficiency according to the embodiment of the present disclosure.

The example illustrated in FIG. 4 assumes that the first terminal 150 has installed the first profile having the ProfileID1 therein through the profile installation process described with reference to FIG. 2 based on operations 201 through 207. In the example illustrated in FIG. 4, the first terminal 150, upon receiving a terminal swap request event to request terminal swap, deletes the first profile installed in the internal eUICC thereof and allows the second terminal 170 to reuse or enable the deleted first profile.

Referring to FIG. 4, upon detecting the terminal swap request event to request the terminal swap in operation 401, the first terminal 150 determines that terminal swap from the first terminal 150 to the second terminal 10 has to be performed using Bluetooth communication or quick release (QR) code-based communication with the second terminal 170 in operation 403. The first terminal 150 then deletes the first profile installed in the internal eUICC thereof in operation 405 and generates the eUICC_Signature for the first terminal 150 in operation 407. The eUICC_Signature value pertains to at least one of a type indicator requesting terminal swap, ProfileID1, a unique value, EID1, and EID2. The first terminal 150 transmits a terminal swap request message to the SM server 130 in operation 409. The terminal swap request message includes at least one of the generated eUICC_Signature, a type indicator requesting terminal swap, ProfileID1, a unique value, EID1, and EID2.

The SM server 130, upon receiving the terminal swap request message from the first terminal 150, verifies based on the eUICC_Signature included in the terminal swap request message whether the terminal swap request message has been transmitted from the previously authenticated first terminal 150. For example, if the eUICC_Signature for the first terminal 150 stored inside the SM server 130 and the eUICC_Signature included in the request message have the same value, the SM server 130 may verify that the request message has been transmitted from the previously authenticated first terminal 150.

If the verification is successful, the SM server 130 transmits the terminal swap request message received from the first terminal 150 to the operator server 110 in operation 413. In this case, the SM server 130 transmits an indicator indicating that the verification with respect to the eUICC_Signature included in the terminal swap request message has been completed to the operator server 110 through the terminal swap request message.

The operator server 110, upon receiving the terminal swap request message from the SM server 130, verifies the eUICC_Signature included in the terminal swap request message or determines an indicator indicating that the verification with respect to the eUICC_Signature has been completed, and determines that the ProfileID1 is reusable based on the terminal swap request message in operation 415. Thus, the operator server 110 sends an order (DownloadProfileOrder) for allocating the ProfileID1 to the second terminal 170 based on the ProfileID and the EID that are included in the terminal swap request message in operation 417. The DownloadProfileOrder message may include the EID2 and the ProfileID1.

Thus, mutual authentication is performed by using the subscriber identifier and the encryption key K for authentication between the SM server 130 and the second terminal 170 in operation 419. After completion of mutual authentication, the second terminal 170 receives a message for downloading the first profile having ProfileID1 from the SM server 130 and downloads the first profile having the ProfileID1 from the SM server 130 by using the received message in operation 421 and installs the downloaded first profile in the internal eUICC of the second terminal 170 in operation 425.

In operations 421 and 425, a unique value for the first profile, which is used during installation of the first profile, may be obtained in the internal eUICC of the second terminal 170. The unique value may be exchanged or transmitted in a process of transmitting and receiving a message for downloading the first profile between the SM server 130 and the second terminal 170. The unique value may be, for example, one of the MatchingID, the EventID, the TransactionID, a challenge value generated in the SM server 130, and a challenge value generated in the second terminal 170. The unique value may be a value corresponding to combinations of a plurality from among the MatchingID, the EventID, the TransactionID, and the challenge value generated by the SM server 130, and the challenge value generated by the second terminal 170 or a value derived from the combinations.

Referring back to FIG. 4, if downloading or installation of the first profile is completed in the second terminal 170, the SM server 130 transmits a notification message indicating that the first profile is allocated to the second terminal 170 to the operator server 110 in operation 427. The notification may include the ProfileID1 for notifying that the first profile is allocated.

The above description has been made of the method for deleting the installed first profile and installing the deleted first profile in the second terminal 170 between the SM server 130 and the first terminal 150 in the communication system, and with reference to FIG. 4, a description will now be made of an example of deleting the first profile from the first terminal 150 through a UI and installing the first profile in the eUICC mounted inside the second terminal 170.

Figure 5:
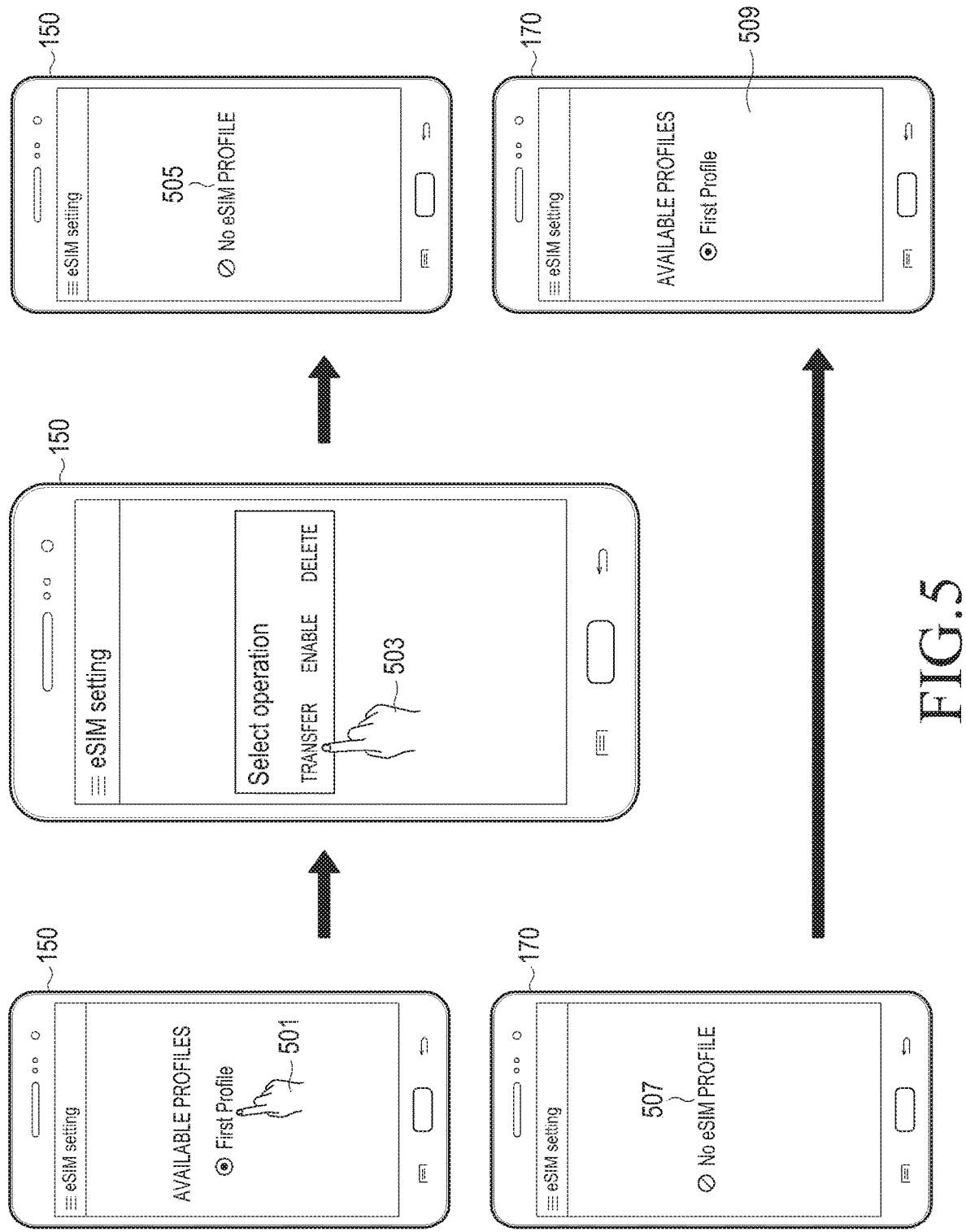
FIG. 5 illustrates an example in which a terminal is swapped through a UI and a profile is reused in a terminal of communication system according to an embodiment of the present disclosure.

FIG. 5 illustrates an example in which a terminal is swapped through a UI and a profile is reused in a communication system according to an embodiment of the present disclosure. In the example of FIG. 5, the user stops use of the first terminal 150 and uses the second terminal 170 instead.

Referring to FIG. 5, if available profiles are output on a UI of an application for eSIM setting of the first terminal 150, the first terminal 150 receives a select event to select the first profile for transferring the first profile among the available profiles to the second terminal 170 as indicated by 501. In the same timing, information indicating absence of the available profiles may be output on the UI of the second terminal 17 in operation 507.

Then, once a select operator for select operations including transfer, enable, and delete is output on the UI of the first terminal 150, the first terminal 150 receives a profile transfer request event for requesting transfer of the selected first profile through the output select operator as indicated by 503. As the first terminal 150 deletes the first profile installed in the internal eUICC thereof, absence of the available profiles may be indicated on the UI as indicated by 505.

The first profile deleted from the first terminal 150 may be installed in an internal eUICC of the second terminal 170 through a profile transmission and reception process between the operator server 110, the SM server 130, and the second terminal 170 as in the example shown in FIG. 4. Thus, the second terminal 170 outputs the first profile as the available profiles on the UI in operation 509.

Meanwhile, unlike in the example shown in FIGS. 4 and 5, the operator server 110 may determine to allocate a second profile without directly allocating the first profile to the second terminal 170. An example of such a case will be described in detail with reference to FIG. 6.

Figure 6:
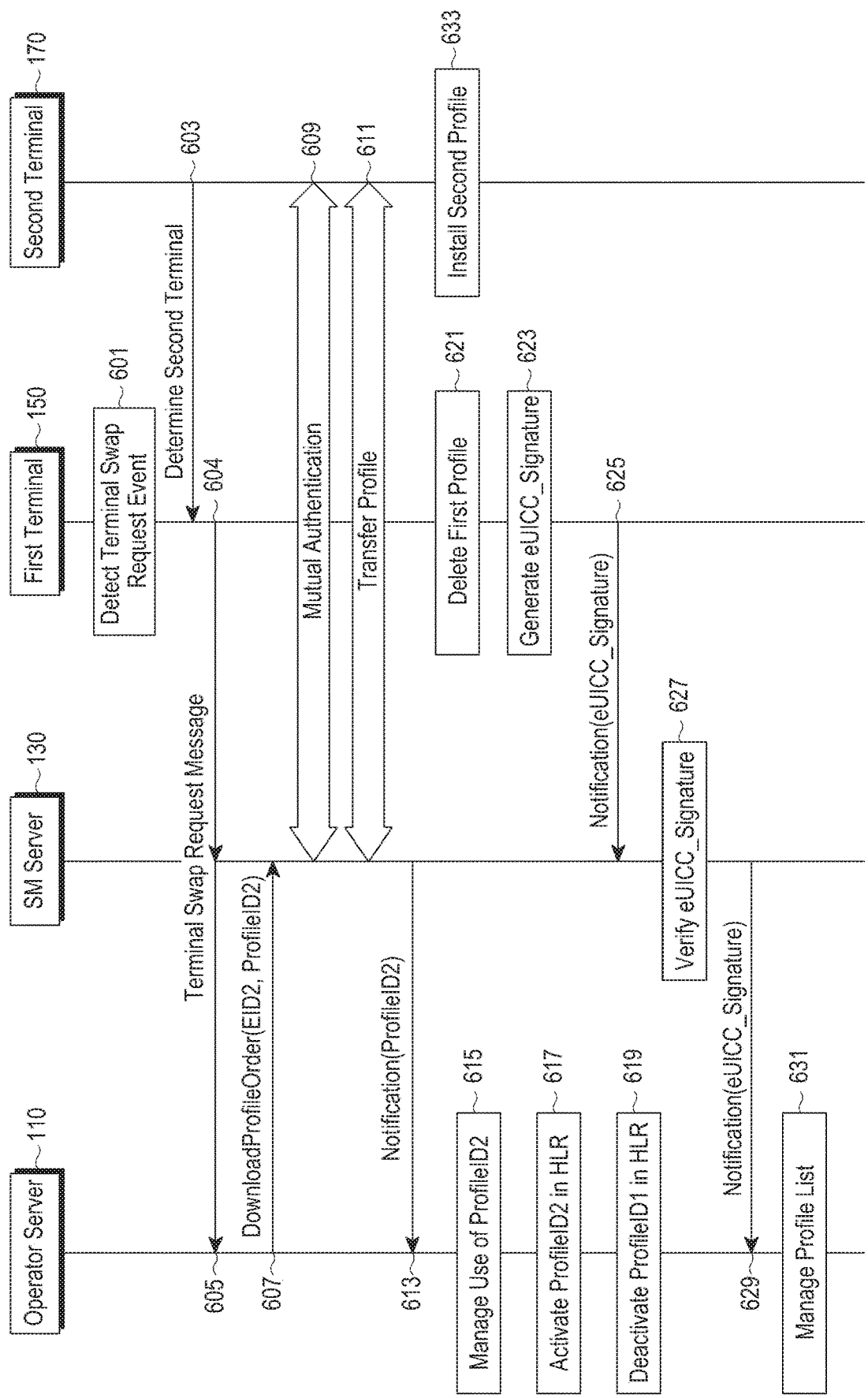
FIG. 6 is a diagram illustrating another example of a method for transmitting and receiving a profile, making it possible to increase the efficiency of use of a profile in a communication system according to an embodiment of the present disclosure.

FIG. 6 illustrates another example of a method for transmitting and receiving profiles that increases efficiency of use of a profile in a communication system according to an embodiment of the present disclosure.

The example illustrated in FIG. 6 assumes that the first terminal 150 has installed the first profile having the ProfileID1 therein through the profile installation process described with reference to FIG. 2 based on operations 201 through 207. In the example illustrated in FIG. 6, the first terminal 150, upon receiving a terminal swap request event to request terminal swap, deletes the first profile installed in the internal eUICC thereof and installs the second profile in the internal eUICC of the second terminal 170.

Referring to FIG. 6, upon detecting the terminal swap request event to request the terminal swap in operation 601, the first terminal 150 determines that terminal swap from the first terminal 150 to the second terminal 170 has to be performed using Bluetooth communication or QR code-based communication with the second terminal 170 in operation 603. The first terminal 150 transmits the terminal swap request message for requesting terminal swap to the operator server 110 through the SM server 130 in operations 604 and 605. The terminal swap request message may include the ProfileID1, the EID1, and the EID2. Before transmitting the terminal swap request message to the operator server 110, the first terminal 150 may perform additional mutual authentication with the SM server 130.

The operator server 110 having received the terminal swap request message sends an order (DownloadProfileOrder) for providing the second profile having the ProfileID2 to the second terminal 170 to the SM server 130 in operation 607. The DownloadProfileOrder message may include the EID2 and the ProfileID1.

Thus, mutual authentication is performed by using the subscriber identifier and the encryption key K for authentication between the SM server 130 and the second terminal 170 in operation 609. After completion of mutual authentication, the second terminal 170 receives a message for downloading the second profile having the ProfileID2 from the SM server 130 and downloads the second profile having the ProfileID2 from the SM server 130 by using the received message in operation 611 and installs the downloaded second profile in the internal eUICC of the second terminal 170 in operation 633.

In operations 609 and 611, a unique value for the second profile, which is used during installation of the first profile, may be obtained in the internal eUICC of the second terminal 170. The unique value may be exchanged or transmitted in a process of transmitting and receiving a message for downloading the second profile between the SM server 130 and the second terminal 170. The unique value may be, for example, one of the MatchingID, the EventID, the TransactionID, a challenge value generated in the SM server 130, and a challenge value generated in the second terminal 170. The unique value may be a value corresponding to combinations of a plurality from among the MatchingID, the EventID, the TransactionID, and the challenge value generated by the SM server 130, and the challenge value generated by the second terminal 170 or a value derived from the combinations.

Referring back to FIG. 6, if downloading or installation of the second profile is completed in the second terminal 170, the SM server 130 transmits a notification message indicating that the second profile is allocated to the second terminal 170 to the operator server 110 in operation 613. The notification may include the ProfileID2 for notifying that the second profile is allocated.

The operator server 110, after receiving the notification message including the ProfileID2 from the SM server 130, performs binding indicating that the second profile is used in operation 615. The operator server 110 activates the ProfileID2 and deactivates the ProfileID1 in a home location register (HLR) in operations 617 and 619.

The first terminal 150 then deletes the first profile installed in the internal eUICC thereof in operation 621 and generates the eUICC_Signature for notifying deletion of the first terminal 150 in operation 623. The eUICC_Signature value pertains to at least one of a type indicator indicating profile deletion, ProfileID1, a unique value, and EID1. The first terminal 150 transmits a notification message including the generated eUICC_Signature to the SM server 130 in operation 625. The SM server 130, upon receiving the notification message including the eUICC_Signature from the first terminal 150, verifies based on the eUICC_Signature whether the notification message has been transmitted from the previously authenticated first terminal 150. For example, if the eUICC_Signature for the first terminal 150 stored inside the SM server 130 and the eUICC_Signature included in the request message have the same value, the SM server 130 may verify that the request message has been transmitted from the previously authenticated first terminal 150.

If the verification is successful, the SM server 130 delivers the notification message received from the first terminal 150 to the operator server 110 in operation 629. In this case, the SM server 130 transmits an indicator indicating that the verification with respect to the eUICC_Signature included in the notification message has been completed to the operator server 110 through the notification message.

The operator server 110, upon receiving the notification message from the SM server 130, determines based on the type indicator, the ProfileID1, and the EID1 included in the notification message that the first profile having the ProfileID1 allocated to the previous first terminal 150 has been deleted, and manages the first profile having the ProfileID1 as an available profile in the profile list in operation 631. Thus, the operator server 110 may reuse the first profile having the ProfileID1 installed in the internal eUICC of the previous first terminal 150 in another terminal.

The above description has been made of examples of the method for transmitting and receiving a profile for profile deletion and/or terminal swap in a communication system according to an embodiment of the present disclosure, and with reference to FIGS. 7A and 7B through 9, a method for transmitting and receiving a profile for profile deletion and/or terminal swap in each entity included in the communication system will be described.

Figure 7A:
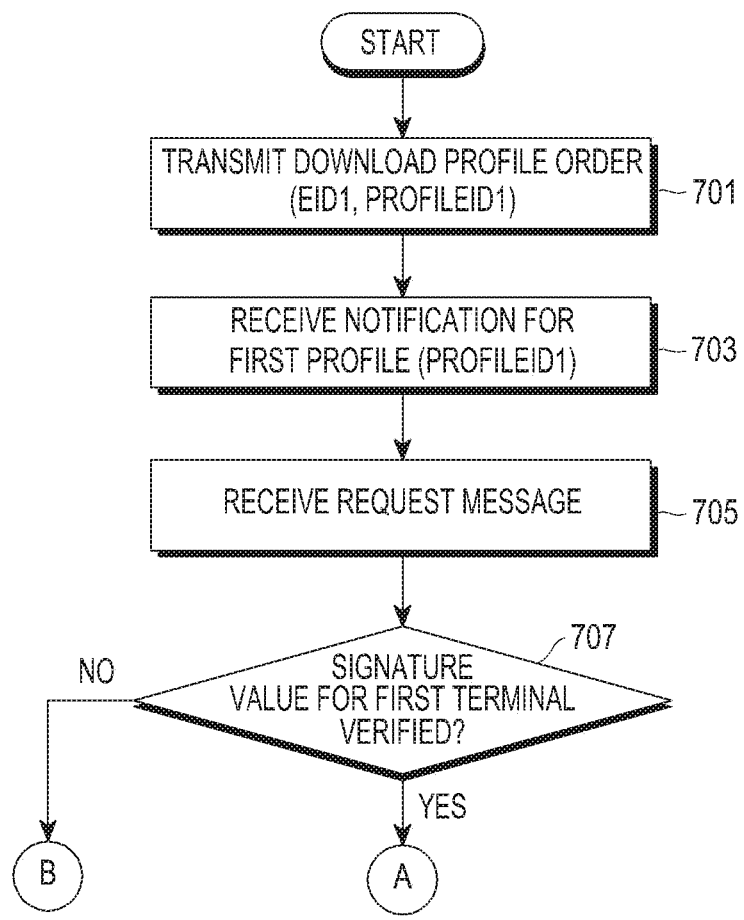
FIGS. 7A and 7B are flowcharts of a method for transmitting and receiving a profile by an operator server of a communication system according to an embodiment of the present disclosure.
Figure 7B:
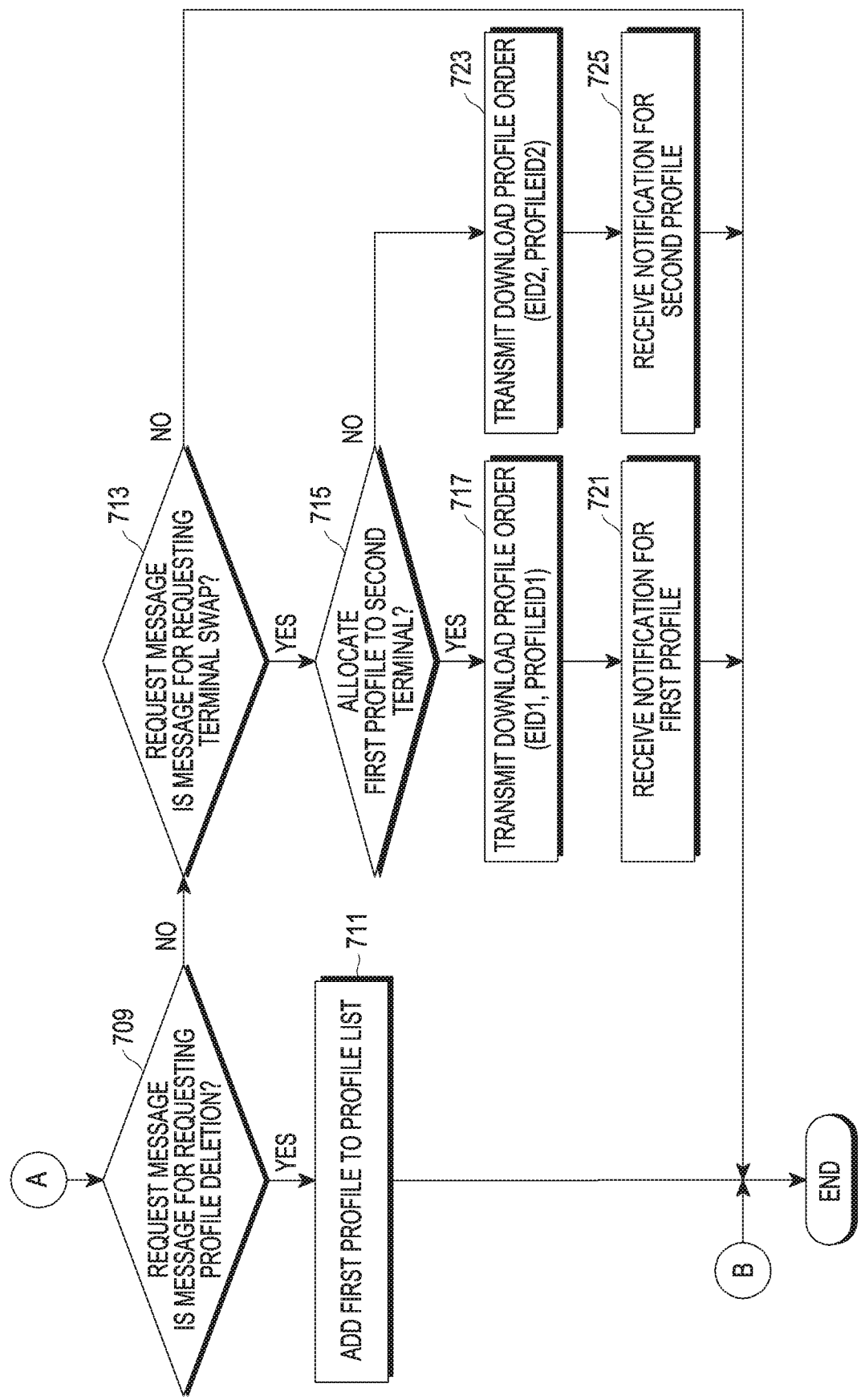

FIGS. 7A and 7B illustrate a method for transmitting and receiving a profile by an operator server of a communication system according to an embodiment of the present disclosure.

Referring to FIGS. 7A and 7B, the operator server 110 transmits a download profile order (EID1 and ProfileID1) ordering allocation of the first profile having the ProfileID1 for the first terminal 150 to the SM server 130 in operation 701. The operator server 110 receives a notification message regarding the first profile, which indicates allocation of the first profile having the ProfileID1 has been completed for the first terminal 150, from the SM server 130 in operation 703.

The operator server 110 then receives a request message from the SM server 130 in operation 705. The received request message includes a signature value (that is, eUICC_Signature) for the first terminal 150, and data requesting profile deletion or terminal swap. The data requesting the profile deletion or the terminal swap may include at least one of a request type indicator, the ProfileID1, the EID1, the EID2, and the unique value.

The operator server 110 determines whether verification with respect to the signature value of the first terminal 150 included in the request message has been successfully completed by the SM server 130, in operation 707. For example, the operator server 110 may determine based on an indicator indicating completion of verification with respect to the eUICC_Signature included in the request message whether the verification with respect to the signature value of the first terminal 150 has been successfully completed. In another example, the operator server 110 may directly perform verification with respect to the signature value of the first terminal 150.

If the verification with respect to the signature value of the first terminal 150 is not successfully completed, the operator server 110 terminates the operation without accepting a request corresponding to the request message. On the other hand, if the verification with respect to the signature value of the first terminal 150 is successfully completed, the operator server 110 determines based on the request type indicator included in the request message whether the request message is a message for requesting profile deletion in operation 709.

if the request message is the message for requesting profile deletion, the operator server 110 determines based on the request message that the first profile having the ProfileID1 is deleted from the first terminal 140 and adds the first profile having the ProfileID1 to the profile list in operation 711. On the other hand, if the request message is not the message for requesting profile deletion, the operator server 110 determines whether the request message is a message for requesting terminal swap. If the request message is the message for requesting terminal swap, the operator server 110 determines based on the request message whether to allocate the first profile used in the previous first terminal 150 to the second terminal 170 in operation 715.

If determining to allocate the first profile to the second terminal 170, the operator server 110 the download profile order ordering allocation of the first profile having the ProfileID1 for the second terminal 170 to the SM server 130 in operation 717. The operator server 110 receives a notification message regarding the first profile, which indicates allocation of the first profile having the ProfileID1 has been completed for the second terminal 170, from the SM server 130 in operation 703.

On the other hand, if determining to allocate a profile other than the first profile to the second terminal 170, the operator server 110 a download profile order ordering allocation of the second profile having another ProfileID (for example, the ProfileID2) for the second terminal 170 to the SM server 130 in operation 723. The operator server 110 then receives a notification message regarding the second profile, which indicates allocation of the second profile having the ProfileID2 has been completed for the second terminal 170, from the SM server 130 in operation 725.

In this way, the operator server 110 may add the first profile used in the first terminal to the profile list that manages available profiles or controls the SM server 130 for reuse of the first profile in the second terminal 170, at the request of the first terminal 150.

Meanwhile, in an embodiment of the present disclosure, it has been described that the type indicator included in the request message pertains to profile deletion or terminal swap, but the operator server 110 and the SM server 130 may perform operations corresponding to a type indicator if the type indicator indicates another request.

The foregoing description has been made of the method for transmitting and receiving a profile by the operator server 110 in the communication system according to an embodiment of the present disclosure, and with reference to FIG. 8, the following description will be made of a method for transmitting and receiving a profile by the SM server 130.

Figure 8:
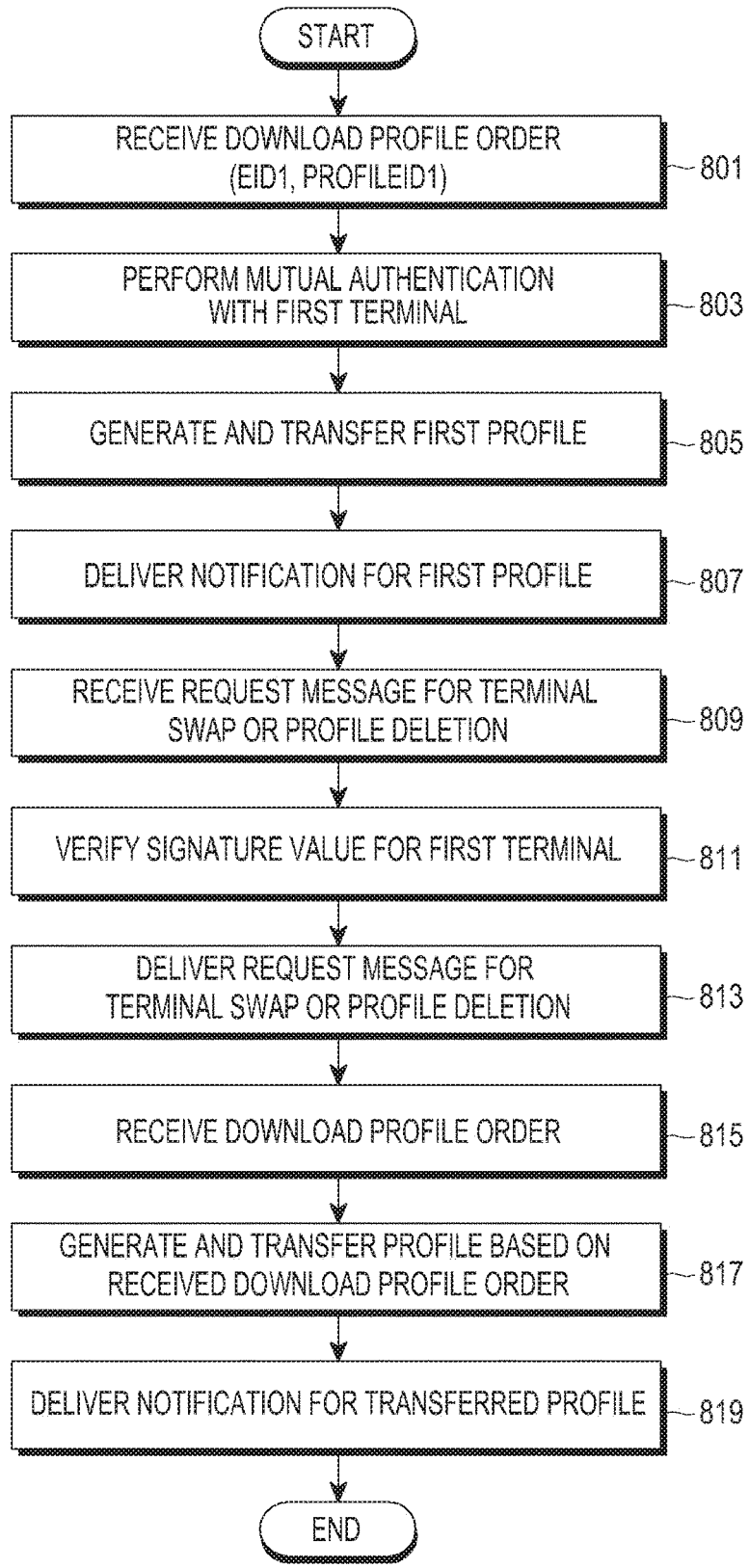
FIG. 8 is a flowchart illustrating a method for transmitting a profile by an SM server of a communication system according to an embodiment of the present disclosure.

FIG. 8 illustrates a method for transmitting and receiving a profile by an SM server of a communication system according to an embodiment of the present disclosure.

Referring to FIG. 8, the SM server 130 receives a download profile order (EID1 and ProfileID1) ordering allocation of the first profile having the ProfileID1 for the first terminal 150 from the operator server 110 in operation 801. The SM server 130 performs mutual authentication by using the subscriber identifier and the encryption key with the first terminal 150 in operation 803. The SM server 130 transmits a message for downloading the first profile having the ProfileID1 and transmits the first profile at the request of the first terminal 150 in operation 805. The SM server 130 transmits a notification message indicating that the first profile has been allocated for the first terminal 150 to the operator server 110 in operation 807.

Thereafter, upon receiving a request message for terminal swap or profile deletion from the first terminal 150 in operation 809, the SM server 130 verifies a signature value (that is, eUICC_Signature) of the first terminal 150 included in the request message in operation 811.

If the verification with respect to the signature value of the first terminal 150 is successfully completed, the SM server 130 delivers the request message delivered from the first terminal 150 to the operator server 110 in operation 813. The request message may include at least one of the signature value of the first terminal 150, the request type indicator related to the signature value of the first terminal 150, the ProfileID1, the EID1, the EID2, and the unique value. The request message may further include an indicator indicating that verification with respect to the signature value of the first terminal 150 has been completed. If the verification with respect to the signature value of the first terminal 150 is not successfully completed, the SM server 130 determines that the request message is not transmitted from the first terminal 150 and does not perform a subsequent operation.

Upon receiving the download profile order from the operator server 110 in operation 815, the SM server 130 generates and transfers a profile for a terminal included in the received download profile order based on the received download profile order in operation 817. The SM server 130 delivers a notification message regarding the transferred profile to the operator server 110 in operation 819. For example, upon receiving the download profile order (EID2 and ProfileID1) from the operator server 110 in operation 813, the SM server 130 generates the first profile having the ProfileID1 and transmits the first profile to the second terminal 170 in operation 815. In another example, upon receiving the download profile order (EID2 and ProfileID2) from the operator server 110 in operation 813, the SM server 130 generates the second profile having the ProfileID2 and transmits the second profile to the second terminal 170 in operation 815.

The foregoing description has been made of the method for transmitting and receiving a profile by the SM server 130 in the communication system according to an embodiment of the present disclosure, and with reference to FIG. 9, the following description will be made of a method for transmitting and receiving a profile by the terminal.

Figure 9:
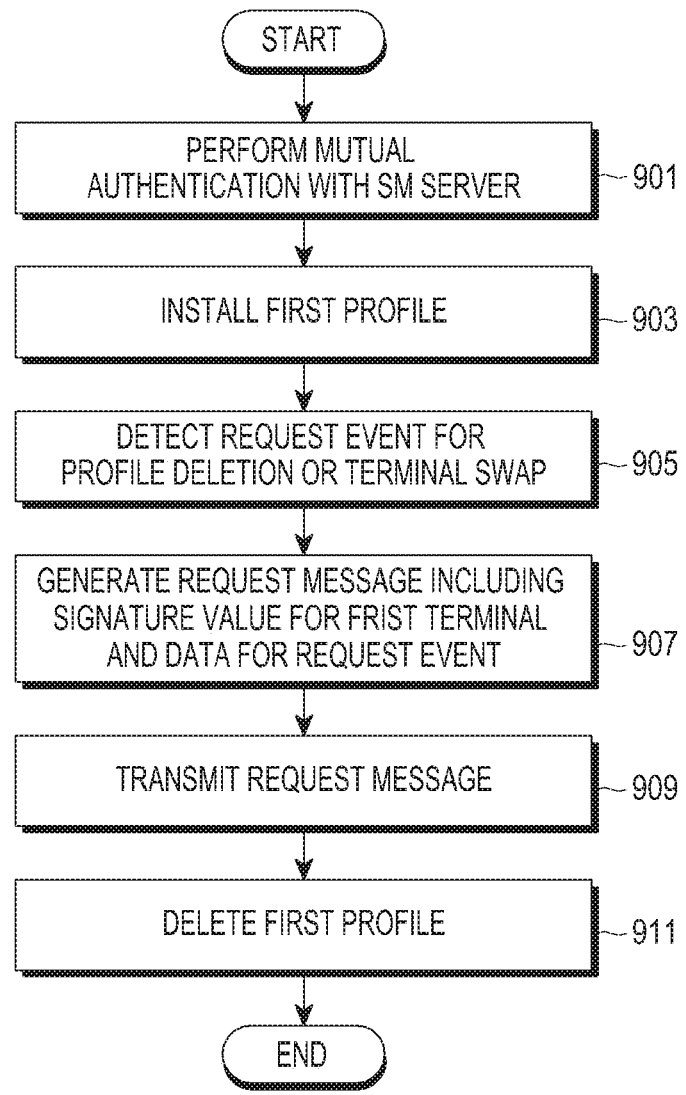
FIG. 9 is a flowchart illustrating a method for transmitting a profile by a terminal of a communication system according to an embodiment of the present disclosure.

FIG. 9 illustrates a method for transmitting and receiving a profile by a terminal of a communication system according to an embodiment of the present disclosure. For convenience of a description with reference to FIG. 9, the description will be made assuming that the terminal is the first terminal 150, but the method for transmitting and receiving a profile in FIG. 9 may be performed in any terminal included in the communication system.

Referring to FIG. 9, the first terminal 150 performs mutual authentication by using a subscriber identifier and an encryption key K for authentication with the SM server 130 in operation 901, and upon receiving a message for downloading the first profile having the ProfileID1, downloads the first profile and installs the first profile in the internal eUICC thereof in operation 903.

Thereafter, upon detecting a request event for profile deletion or terminal swap through an input unit in operation 905, the first terminal 150 generates a request message including at least one of a signature value of the first terminal 150 and data for requesting profile deletion or terminal swap in operation 907. The first terminal 150 delivers the generated request message to the SM server 130 and deletes the first profile in operation 911. The data requesting the profile deletion or the terminal swap may include at least one of a request type indicator, the ProfileID1, the EID1, the EID2, and the unique value.

The foregoing description has been made of the method for transmitting and receiving a profile by the first terminal 150 in the communication system according to an embodiment of the present disclosure, and with reference to FIGS. 10 through 12, the following description will be made of an internal structure of each entity for transmitting and receiving a profile in the communication system.

Figure 10:
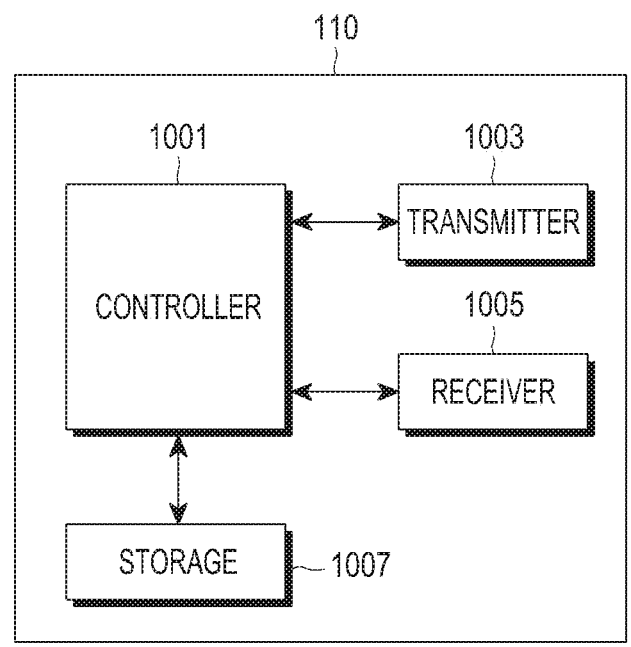
FIG. 10 is a diagram of an operator server for transmitting and receiving a profile in a communication system according to an embodiment of the present disclosure.

FIG. 10 is a diagram of an operator server for transmitting and receiving a profile in a communication system according to an embodiment of the present disclosure.

Referring to FIG. 10, the operator server 110 may include a controller 1001, a transmitter 1003, a receiver 1005, and a storage 1007.

The controller 1001 controls overall operations of the operator server, especially, operations related to transmission and reception of a profile according to an embodiment of the present disclosure. The operations related to transmission and reception of a profile according to an embodiment of the present disclosure are the same as the description made with reference to FIGS. 7A and 7B, and thus a detailed description thereof will not be provided.

The transmitter 1003 receives various signals and various messages from other entities included in the communication system, under control of the controller 1001. Herein, various signals and messages received by the transmitter 1003 are the same as those described above with reference to FIGS. 2 through 7A and 7B, and thus will not be described in detail at this time.

The receiver 1005 receives various signals and various messages from other entities included in the communication system, under control of the controller 1001. Herein, various signals and messages received by the receiver 1005 are the same as those described above with reference to FIGS. 2 through 7A and 7B, and thus will not be described in detail at this time.

The storage 1007 stores programs and various data which are associated with profile transmission/reception performed by the operator server 110 in the communication system according to an embodiment of the present disclosure, under control of the controller 1001. The storage 1007 also stores various signals and various messages received by the receiver 1005 from the other entities.

In FIG. 10, the operator server 110 is illustrated as being implemented with separate units such as the controller 1001, the transmitter 1003, the receiver 1005, and the storage 1007, but the operator server 110 may also be implemented with an integrated form of at least two of the controller 1001, the transmitter 1003, the receiver 1005, and the storage 1007. The operator server 110 may be implemented with one processor.

Figure 11:
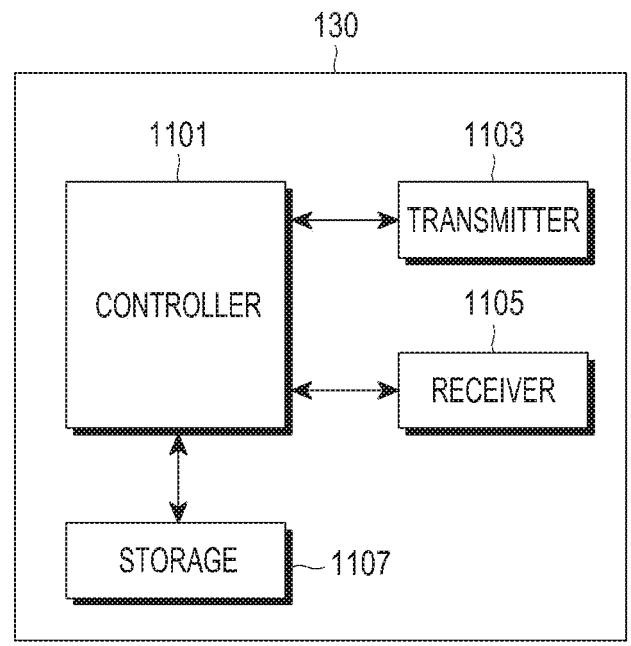
FIG. 11 is a diagram of an SM server for transmitting and receiving a profile in a communication system according to an embodiment of the present disclosure.

FIG. 11 is a diagram of an SM server for transmitting and receiving a profile in a communication system according to an embodiment of the present disclosure.

Referring to FIG. 11, the SM server 130 may include a controller 1101, a transmitter 1103, a receiver 1105, and a storage 1107.

The controller 1101 controls overall operations of the SM server 130, especially, operations related to profile transmission and reception according to an embodiment of the present disclosure. Herein, the overall operations related to profile transmission and reception according to an embodiment of the present disclosure are the same as those described above with reference to FIGS. 2 through 6 and 8, and thus will not be described in detail at this time.

The transmitter 1103 receives various signals and various messages from other entities included in the communication system, under control of the controller 1101. Herein, various messages received by the transmitter 1103 are the same as those described above with reference to FIGS. 2 through 6 and 8, and thus will not be described in detail at this time.

The receiver 1105 receives various signals and various messages from other entities included in the communication system, under control of the controller 1101. Herein, various signals and messages received by the receiver 1105 are the same as those described above with reference to FIGS. 2 through 6 and 8, and thus will not be described in detail at this time.

The storage 1107 stores programs and various data which are associated with signal transmission/reception performed by the SM server 130 in the communication system according to an embodiment of the present disclosure, under control of the controller 1101. The storage 1107 also stores various signals and various messages received by the receiver 1105 from the other entities.

In FIG. 11, the SM server 130 is illustrated as being implemented with separate units such as the controller 1101, the transmitter 1103, the receiver 1105, and the storing unit 1107, but the SM server 130 may also be implemented with an integrated form of at least two of the controller 1101, the transmitter 1103, the receiver 1105, and the storing unit 1107. The SM server 130 may be implemented with one processor.

Figure 12:
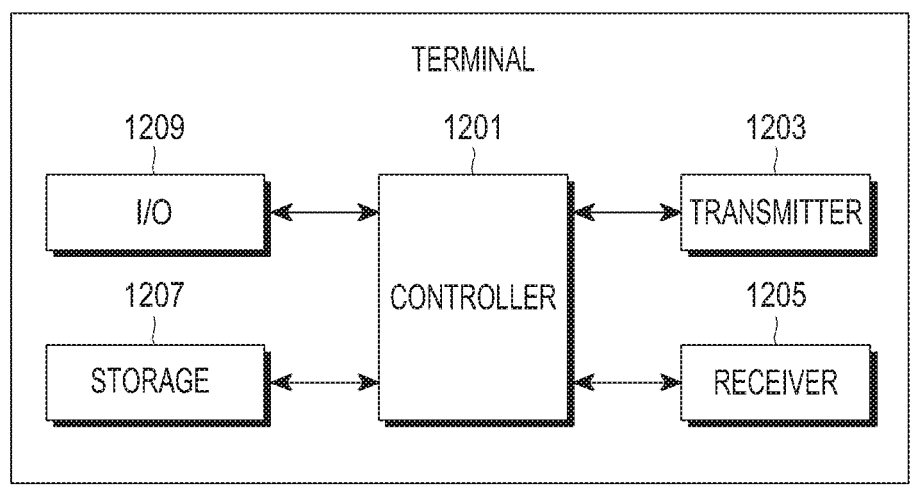
FIG. 12 is a diagram of a terminal for transmitting and receiving a profile in a communication system according to an embodiment of the present disclosure.

FIG. 12 is a diagram of a terminal for transmitting and receiving a profile in a communication system according to an embodiment of the present disclosure.

Referring to FIG. 12, the terminal may include a controller 1201, a transmitter 1203, a receiver 1205, a storage 1207, and an input/output (I/O) unit 1209.

The controller 1201 controls overall operations of the terminal, especially, operations related to profile transmission and reception according to an embodiment of the present disclosure. Herein, the overall operations related to profile transmission and reception according to an embodiment of the present disclosure are the same as those described above with reference to FIGS. 2 through 6 and 10, and thus will not be described in detail at this time.

The transmitter 1203 receives various signals and various messages from other entities included in the communication system, under control of the controller 1201. Herein, various messages received by the transmitter 1203 are the same as those described above with reference to FIGS. 2 through 6 and 10, and thus will not be described in detail at this time.

The receiver 1205 receives various signals and various messages from other entities included in the communication system, under control of the controller 1201. Herein, various signals and messages received by the receiver 1205 are the same as those described above with reference to FIGS. 2 through 6 and 10, and thus will not be described in detail at this time.

The storage 1207 stores programs and various data which are associated with profile transmission/reception performed by the terminal according to an embodiment of the present disclosure, under control of the controller 1201. The storage 1207 also stores various signals and various messages received by the receiver 1205 from the other entities.

The I/O 1209 inputs and outputs programs and various data which are associated with profile transmission/reception performed by the terminal according to an embodiment of the present disclosure, under control of the controller 1201.

In FIG. 12, the terminal is illustrated as being implemented with separate units such as the controller 1201, the transmitter 1203, the receiver 1205, the storage 1207, and the I/O 1209, but the terminal may also be implemented with an integrated form of at least two of the controller 1201, the transmitter 1203, the receiver 1205, the storage 1207, and the I/O 1209. The terminal may be implemented with one processor.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for transmitting and receiving a profile by a terminal in a communication system, the method comprising:
    downloading, from a server that manages the profile for providing a communication service, the profile;
    installing the profile in a universal integrated circuit card (UICC);
    detecting a request event associated with deletion of the profile, wherein the request event is received through a user interface (UI) of an application;
    in response to detecting the request event, deleting the profile from the UICC; and
    transmitting a request message, comprising a unique value for the profile and associated with the deletion of the profile, to the server,
    wherein an identifier associated with the profile is added to a profile list based on the request message.

2. The method of claim 1, further comprising, in response to detecting the request event, generating the request message corresponding to the request event.

3. The method of claim 2,
wherein the request event is for requesting at least one of deletion of the profile or swap of the terminal, and
wherein the request message further comprises at least one of a signature value for verifying whether the request message is transmitted from the terminal, a request type identifier indicating a type of the request event, an identifier of the profile, an identifier of the terminal, or an identifier of a terminal to be swapped.

4. The method of claim 2, wherein the unique value for the profile comprises at least one of:
a matching identifier (MatchingID),
an event identifier (EventID),
a transaction identifier (TransactionID),
a challenge value generated by the server,
a challenge value generated in the UICC,
a value derived from the MatchingID,
a value derived from the EventID,
a value derived from the TransactionID,
a value derived from the challenge value generated by the server, or
a value derived from the challenge value generated in the UICC.

5. The method of claim 1, wherein the UICC is embedded in the terminal.

6. The method of claim 1, wherein the application is a local profile assistant (LPA).

7. The method of claim 1, wherein, after the profile is deleted, the deleted profile is reused or enabled in another terminal.

8. A method for transmitting and receiving a profile by a server in a communication system, the method comprising:
allocating the profile for providing a communication service to a terminal using a universal integrated circuit card (UICC);
receiving a request message, comprising a unique value for the profile and associated with deletion of the profile, from the terminal; and
in response to receiving the request message, adding an identifier associated with the profile to a profile list based on the request message,
wherein the profile is deleted at the terminal in response to a request event received through a user interface (UI) of an application.

9. The method of claim 8,
wherein the request message is for requesting at least one of deletion of the profile or swap of the terminal, and
wherein the request message further comprises at least one of a signature value for verifying whether the request message is transmitted from the terminal, a request type identifier indicating a type of a request event, an identifier of the profile, an identifier of the terminal, or an identifier of a terminal to be swapped.

10. The method of claim 8,
wherein the adding is performed in response to successful completion of verification.

11. The method of claim 8, wherein a request type identifier included in the request message is for requesting swap of the terminal and the request message further comprises an identifier of the terminal to be swapped,
the method further comprising:
allocating the profile to a terminal corresponding to the identifier of the terminal to be swapped, based on at least one of an identifier of the profile, an identifier of the terminal, or the identifier of the terminal to be swapped.

12. The method of claim 8, wherein the unique value for the profile comprises at least one of:
a matching identifier (MatchingID),
an event identifier (EventID),
a transaction identifier (TransactionID),
a challenge value generated by the server,
a challenge value generated in the UICC,
a value derived from the MatchingID,
a value derived from the EventID,
a value derived from the TransactionID,
a value derived from the challenge value generated by the server, or
a value derived from the challenge value generated in the UICC.

13. An apparatus for transmitting and receiving a profile in a communication system, the apparatus comprising:
a transceiver configured to transmit and receive data; and
a controller configured to:
download, from a server that manages the profile for providing a communication service, the profile,
install the profile in a universal integrated circuit card (UICC),
detect a request event associated with deletion of the profile, wherein the request event is received through a user interface (UI) of an application,
in response to detecting the request event, delete the profile from the UICC, and
transmit a request message, comprising a unique value for the profile and associated with the deletion of the profile, to the server,
wherein an identifier associated with the profile is added to a profile list based on the request message.

14. The apparatus of claim 13, wherein the controller is further configured to, in response to detecting the request event, generate the request message corresponding to the request event.

15. The apparatus of claim 14,
wherein the request event is for requesting at least one of deletion of the profile or swap of a terminal, and
wherein the request message further comprises at least one of a signature value for verifying whether the request message is transmitted from the terminal, a request type identifier indicating a type of the request event, an identifier of the profile, an identifier of the terminal, or an identifier of a terminal to be swapped.

16. The apparatus of claim 13, wherein the UICC is embedded in the apparatus.

17. An apparatus for transmitting and receiving a profile in a communication system, the apparatus comprising:
a transceiver configured to transmit and receive data; and
a controller configured to:
allocate a profile for providing a communication service to a terminal using a universal integrated circuit card (UICC),
receive a request message, comprising a unique value for the profile and associated with deletion of the profile, from the terminal, and
in response to receiving the request message, add an identifier associated with the profile to a profile list based on the request message,
wherein the profile is deleted at the terminal in response to a request event received through a user interface (UI) of an application.

18. The apparatus of claim 17,
wherein the request message is a message for requesting at least one of deletion of the profile or swap of the terminal, and wherein the request message further comprises at least one of a signature value for verifying whether the request message is transmitted from the terminal, a request type identifier indicating a type of a request event, an identifier of the profile, an identifier of the terminal, or an identifier of a terminal to be swapped.

19. The apparatus of claim 18, wherein the controller is further configured to add the identifier in response to successful completion of verification with respect to the signature value.

20. The apparatus of claim 17, wherein the unique value for the profile comprises at least one of:
    a matching identifier (MatchingID),
    an event identifier (EventID),
    a transaction identifier (TransactionID),
    a challenge value generated by a server,
    a challenge value generated in the UICC,
    a value derived from the MatchingID,
    a value derived from the EventID,
    a value derived from the TransactionID,
    a value derived from the challenge value generated by the server, or
    a value derived from the challenge value generated in the UICC.

21. The apparatus of claim 17, wherein the request message further comprises an identifier of the terminal to be swapped or a request type identifier included in the request message is for requesting swap of the terminal, and the controller is further configured to:
    allocate the profile to a terminal corresponding to the identifier of the terminal to be swapped, based on at least one of an identifier of the profile, an identifier of the terminal, or the identifier of the terminal to be swapped.

22. The apparatus of claim 17, wherein the unique value for the profile comprises at least one of:
    a matching identifier (MatchingID),
    an event identifier (EventID),
    a transaction identifier (TransactionID),
    a challenge value generated by a server,
    a challenge value generated in the UICC,
    a value derived from the MatchingID,
    a value derived from the EventID,
    a value derived from the TransactionID,
    a value derived from the challenge value generated by the server, or
    a value derived from the challenge value generated in the UICC.

* * * * *